(12) United States Patent
Peiffer et al.

(10) Patent No.: US 6,200,511 B1
(45) Date of Patent: Mar. 13, 2001

(54) POLYESTER FILM HAVING A HIGH OXYGEN BARRIER AND IMPROVED ADHESION TO METAL LAYERS ITS USE AND PROCESS FOR ITS PRODUCTION

(75) Inventors: Herbert Peiffer, Mainz; Cynthia Bennett, Alzey; Guenther Crass, Taunusstein-Wehen; Gottfried Hilkert, Saulheim; Werner Roth, Eppstein, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/275,393

(22) Filed: Mar. 24, 1999

(30) Foreign Application Priority Data

Mar. 25, 1998 (DE) .............................................. 198 13 270

(51) Int. Cl.$^7$ ...................................................... B28B 3/20
(52) U.S. Cl. .................... 264/176.1; 264/216; 428/35.7; 428/480; 430/160; 528/176; 528/272
(58) Field of Search ............................ 430/160; 528/176, 528/272; 264/216, 176.1; 428/480, 35.7

(56) References Cited

U.S. PATENT DOCUMENTS

| | | | |
|---|---|---|---|
| 3,515,626 | 6/1970 | Duffield | 428/336 |
| 3,958,064 | 5/1976 | Brekken et al. | 428/336 |
| 4,042,569 | 8/1977 | Bell et al. | 528/176 |
| 4,252,885 | 2/1981 | McGrail et al. | 430/160 |
| 4,399,179 | 8/1983 | Minami et al. | 430/161 |
| 4,493,872 | 1/1985 | Funderburk et al. | 528/176 |
| 4,615,939 | 10/1986 | Corsi et al. | 430/160 |
| 5,236,680 | 8/1993 | Nakazawa et al. | 423/335 |
| 5,236,683 | 8/1993 | Nakazawa et al. | 423/335 |
| 5,242,757 | 9/1993 | Buisine et al. | 428/480 |
| 5,429,785 | 7/1995 | Jolliffe | 264/216 |
| 5,453,260 | 9/1995 | Nakazawa et al. | 423/321.1 |
| 5,468,527 | 11/1995 | Peiffer et al. | 428/35.7 |
| 5,506,014 | 4/1996 | Minnick | 428/35.7 |

FOREIGN PATENT DOCUMENTS

| | | |
|---|---|---|
| 1694404 | 4/1971 | (DE) . |
| 2230970 | 2/1973 | (DE) . |
| 3801535 | 7/1988 | (DE) . |
| 4306155 | 9/1994 | (DE) . |
| 0 035 835 | 9/1981 | (EP) . |
| 0 061 769 | 10/1982 | (EP) . |
| 0 088 635 | 9/1983 | (EP) . |
| 0 124 291 | 11/1984 | (EP) . |
| 0 135 451 | 3/1985 | (EP) . |
| 0 144 878 | 6/1985 | (EP) . |
| 0 236 945 | 9/1987 | (EP) . |
| 0 296 620 | 12/1988 | (EP) . |
| 0 347 646 | 12/1989 | (EP) . |
| 0 378 154 | 7/1990 | (EP) . |
| 0 378 955 | 7/1990 | (EP) . |
| 0 402 861 | 12/1990 | (EP) . |
| 0 490 665 | 6/1992 | (EP) . |

(List continued on next page.)

OTHER PUBLICATIONS

Barendrecht, W., et al., *Harze natürliche*, in Ullmann's Encyklopädie der Techn. Chemie [*Ullmann's Encyclopedia of Industrial Chemistry*] 4$^{th}$ Ed., vol. 12, pp 525–554. (Ullman ed., 1976).

Weiss, J., *Parameters that influence the barrier properties of metallized polyester and polypropylene films*, Thin Solid Films, vol. 204, 203–216 (1991).

Utz, H., Barriereeigenschaften Aluminiumbedampfter Kunststoffolien [Barrier Properties of Aluminum–Metalized Plastic Film] 66–68 (1995)(Unpublished dissertation, Technishe Universität (Munich)).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

Database WPI, Section Ch, Week 9615, Derwent Publications Ltd., London, GB; Class A23, AN 96–148338, XP002114377 & JP 08 03679 A (Toray Indus., Inc.) (Feb. 6, 1996).

Kimura, F. et al., *FTIR Spectroscopic Study on Crystallization Process of Poly(ethylene–2,6–napthalate)*, 35 Journal of Polymer Science: Polymer Physics 2741–2747 (1997).

*Primary Examiner*—Terressa M. Boykin
(74) *Attorney, Agent, or Firm*—Finnegan, Henderson, Farabow, Garrett & Dunner, L.L.P.

(57) ABSTRACT

The application discloses a transparent, biaxially oriented polyester film having a base layer at least 80% by weight of which is composed of a thermoplastic polyester, and having at least one outer layer, wherein the outer layer is composed of a copolymer or of a mixture of polymers which comprises at least 35 mol % of ethylene 2,6-naphthalate units, up to 44 mol % of ethylene terephthalate units, and from 1 to 20 mol % of ethylene isophthalate units, and also up to 20 mol % of a sulfo-substituted dicarboxylic acid and, if desired, up to 10 mol % of units from aliphatic, including cycloaliphatic, or aromatic diols and/or dicarboxylic acids (based in each case on the total content of dicarboxylic acid or diol).

20 Claims, No Drawings

FOREIGN PATENT DOCUMENTS

| | | |
|---|---|---|
| 0 502 745 | 9/1992 | (EP) . |
| 0 514 129 | 11/1992 | (EP) . |
| 0 515 096 | 11/1992 | (EP) . |
| 0 580 404 | 1/1994 | (EP) . |
| 0 604 057 | 6/1994 | (EP) . |
| 0602964A1 | 6/1994 | (EP) . |
| 0 609 060 | 8/1994 | (EP) . |
| 0 612 790 | 8/1994 | (EP) . |
| 0 659 810 | 6/1995 | (EP) . |
| 0 663 286 | 7/1995 | (EP) . |
| 0 685 509 | 12/1995 | (EP) . |
| 0 707 979 | 4/1996 | (EP) . |
| 0 826 478 | 3/1998 | (EP) . |
| WO 88/10188 | 12/1988 | (WO) . |
| WO 94/13476 | 6/1994 | (WO) . |
| WO 94/13481 | 6/1994 | (WO) . |
| WO 98/13414 | 4/1998 | (WO) . |
| WO 98/13415 | 4/1998 | (WO) . |

POLYESTER FILM HAVING A HIGH OXYGEN BARRIER AND IMPROVED ADHESION TO METAL LAYERS ITS USE AND PROCESS FOR ITS PRODUCTION

The invention relates to a transparent, biaxially oriented polyester film having a base layer at least 80% by weight of which is composed of a thermoplastic polyester, and having at least one outer layer. The invention also relates to the use of the film and to a process for its production.

BACKGROUND OF THE INVENTION

In food and drink packaging, there is frequently a demand for a high level of barrier with respect to gases, water vapor and flavors. Use is therefore usually made of polypropylene films which have been metalized or have been coated with polyvinylidene chloride (PVDC). Metalized polypropylene films, without special pretreatment, have a modest oxygen barrier, and they have poor adhesion between the metal layer and the polypropylene layer. The metal layer can therefore easily be damaged (scratched) with loss of barrier. Metalized polyester films generally have a significantly better barrier with respect to, for example, oxygen, and also somewhat better metal adhesion than untreated polypropylene films, but the danger of damage to the metal layer is also present with metalized polyester film. A PVDC layer also provides a barrier, but layers of this type have to be applied from a solution in a second operation, and this considerably increases the cost of the packaging. Ethylene-vinyl alcohol copolymers (EVOH) likewise exhibit a high barrier. However, films modified with EVOH have particularly severe moisture sensitivity, and this limits their scope of application. Due to their poor mechanical properties, they are also relatively thick or have to be laminated with other materials at high cost. They are, furthermore, difficult to dispose of after use. In addition to this, some raw materials are not approved by the authorities or are unsuitable for producing food and drink packaging.

It is therefore an object of the present invention to provide a biaxially oriented polyester film which is simple and cost-effective to produce, has the good physical properties of the known films, has good adhesion to a layer applied by metalizing, and does not give rise to disposal problems.

DESCRIPTION OF THE INVENTION

The object is achieved by means of a biaxially oriented polyester film having a base layer at least 80% by weight of which is composed of (at least) one thermoplastic polyester, and having at least one outer layer, wherein the outer layer(s) of the film is/are composed of one or more copolyesters which is/are prepared from dicarboxylic acids and diols or derivatives of these, where the dicarboxylic acid component is composed of a mixture of at least 35 mol % of 2,6-naphthalate units, up to 44 mol % of terephthalate units, from 1 to 20 mol % of isophthalate units and from 0 to 20 mol % of an aromatic dicarboxylic acid which has been substituted with an alkali metal sulfo group. The film is preferably transparent.

In other preferred embodiments, the outer layer is composed of a copolymer or of a mixture of polymers which comprises at least 35 mol % of ethylene 2,6-naphthalate units, up to 44 mol % of ethylene terephthalate units, and from 1 to 20 mol % of ethylene isophthalate units, and also up to 20 mol % of a sulfo-substituted dicarboxylic acid and, if desired, up to 10 mol % of units from aliphatic, including cycloaliphatic, or aromatic diols and/or dicarboxylic acids (based in each case on the total content of dicarboxylic acid or diol).

Preference is given to a polyester film in which the polymers of the outer layer comprise at least 60 mol % of ethylene 2,6-naphthalate units, 1–10 mol % to isophthalate units and up to 30 mol % of ethylene terephthalate units. Among these, particular preference is in turn given to a polyester film of this type in which the polymers of the outer layer comprise at least 65% by weight of ethylene 2,6-naphthalate units and up to 25% by weight of ethylene terephthalate units. Preference is also given to films wherein the outer layer comprises at least 70 mol %, more preferably at least 75 mol %, of ethylene 2,6-naphthalate units.

Alkali-metal-sulfo-substituted dicarboxylic acids are understood to be monomers which correspond to the formula:

In this formula,

M is a monovalent cation of an alkali metal, z is a trivalent aromatic radical, and X and Y are carboxyl groups or polyester-forming equivalents.

Examples of monomers of this type are the sodium salts of sulfoterephthalic acid, of 5-sulfoisophthalic acid, of sulfophthalic acid, of 5-(p-sulfophenoxy)isophthalic acid, of 5-(sulfopropoxy)isophthalic acid and of similar monomers, and other examples are the derivatives of these which can form polyesters, for example as the dimethyl esters. M is preferably $Na^+$, $Li^+$ or $K^+$.

Examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Preferred other components of the aromatic dicarboxylic acid mixture are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the ($C_3$–$C_{19}$)alkanedioic acids, where the alkane moiety may be straight-chain or branched, are particularly suitable.

The present invention also provides a process for producing this film. It encompasses a) producing a film from base and outer layer(s) by coextrusion, b) biaxial orientation of the film and c) heat-setting of the oriented film.

To produce the outer layer, it is expedient to feed granules of polyethylene terephthalate and polyethylene 2,6- naphthalate(bne of them is modified with the required quantity of isophthalat) directly to the extruder in the desired mixing ratio. At about 300° C. and with a residence time of about 5 min, the two materials can be melted and can be extruded. Under these conditions, transesterification reactions can occur in the extruder and during these copolymers are formed from the homopolymers.

The polymers for the base layer are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation procedure is generally carried out sequentially or simultaneously. For the sequential stretching, it is preferable to orient firstly in a longitudinal direction (i.e. in the machine direction) and then in a trans-verse direction (i.e. perpendicularly to the machine direction). This causes an orientation of the molecular chains. The orientation procedure in a longitudinal direction may be carried out with the aid of two rolls running at different speeds corresponding to the stretching ratio to be achieved. For the transverse orientation procedure, use is generally made of an appropriate tenter frame. For the simultaneous stretching, the film is stretched in a tenter frame simultaneously in a longitudinal direction and in a transverse direction.

The temperature at which the orientation procedure is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse stretching may be followed by another longitudinal orientation procedure and even a further transverse orientation procedure.

During the subsequent heat-setting, the film is held for from 0.1 to 10 s at a temperature of from 150 to 250° C. The film is then wound up in a conventional manner.

A great advantage of this process is that it is possible to feed the extruder with granules, which do not block the machine.

The base layer of the film is preferably composed to an extent of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—$(CH_2)_n$—OH, where n is an integer from 3 to 6, branched aliphatic glycols having up to 6 carbon atoms, aromatic diols of the formula HO—$C_6H_4$—X—$C_6H_4$—OH where X is —$CH_2$—, —$C(CH_3)_2$—, —$C(CF_3)_2$—, —O—, —S—or —$SO_2$—, or bisphenols of the formula HO—$C_6H_4$—$C_6H_4$—OH.

The dicarboxylic acid comonomer units are preferably derived from benzenedicarboxylic acids, naphthalenedicarboxylic acids, biphenyl-x,x'-dicarboxylic acids (in particular biphenyl-4,4'-dicarboxylic acid), cyclohexanedicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1$—$C_{16}$-alkane-dicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

For processing the polymers, it has proven useful to select the polymers for the base layer and the outer layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). The solution viscosity is a measure of the molecular weight of the respective polymer and correlates with the melt viscosity. The chemical make-up of the polymer used may result in other correlations. For commercially available polyethylene terephthalates which are suitable for producing biaxially oriented films, the SVs are in the range from 600 to 1000.

To ensure satisfactory film quality, the SV of the copolymers for the outer layer should be in the range from 300 to 900, preferably between 400 and 800, in particular between 500 and 700. If desired, a solid phase condensation may be carried out on the respective granules in order to adjust the SVs of the materials as necessary. It is a general rule that the melt viscosities of the polymer melts for base and outer layer(s) should differ by not more than a factor of 5, preferably not more than a factor of from 2 to 3.

The polymers for the outer layer may be prepared in three different ways:
 a) In the copolycondensation, terephthalic acid, isophthalic acid, naphthalene-2,6-dicarboxylic acid and, if desired, the alkali-metal-sulfo-substituted dicarboxylic acid are placed in a reactor together with ethylene glycol, and polycondensed to give a polyester, using the customary catalysts and stabilizers. The terephthalate and naphthalate units are then randomly distributed in the polyester.
 b) Polyethylene terephthalate (PET), polyethylene 2,6-naphthalate (PEN) and polyethylene isophthalate if desired modified with alkali-metal-sulfo-substituted dicarboxylic acids are melted together in the desired ratio and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) PET, PEN and polyethylene isophthalate, if desired modified with alkali-metal-sulfo-substituted dicarboxylic acids, are mixed as granules in the desired ratio, and the mixture is fed to the extruder for the outer layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the outer layer. These are either directly admixed with the base layer during extrusion or are in any case present in the film due to addition of regenerated material.

In another embodiment, the film encompasses, on the side facing away from the outer layer, another outer layer of polyethylene terephthalate, and this layer comprises pigments.

The novel film exhibits a surprisingly high oxygen barrier. If, in contrast, the polymers used for the outer layer(s) comprise(s) less than 35 mol % of ethylene 2,6-naphthalate units and more than 44 mol % of ethylene terephthalate units then in many cases, although the film has somewhat lower oxygen transmission than a standard polyester film (composed to an extent of 100% by weight of polyethylene terephthalate), the transmission is still much too high. It has even been found that the oxygen barrier is poorer than in a standard polyester film if the outer layer comprises from 25 to 35 mol % of ethylene 2,6-naphthalate units and from 65 to 75 mol % of ethylene terephthalate units. However, even under these circumstances there may be advantage in a film having an outer layer which comprises between 5 and 35 mol % of ethylene 2,6-naphthalate units and more than 45 mol % of ethylene terephthalate units, if the oxygen barrier does not play a decisive part in the application concerned.

The base layer and the outer layer(s) may, in addition, comprise customary additives, such as stabilizers and antiblocking agents. They are expediently added to the polymer or to the polymer mixture before melting takes place.

Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium carbonate, barium sulfate, lithium phosphate, calcium phosphate, magnesium phosphate, aluminum oxide, LiF, the calcium, barium, zinc and manganese salts of the dicarboxylic acids used, carbon black, titanium dioxide, kaolin, crosslinked polystyrene particles or crosslinked acrylate particles.

The additives selected may also be mixtures of two or more different antiblocking agents or mixtures of antiblocking agents of the same make-up but of different particle size. The particles may be added to the individual layers in the customary concentrations, e.g. as glycolic dispersion during the polycondensation or via masterbatches during extrusion. Pigment concentrations of from 0.0001 to 5% by weight have proven particularly suitable. A detailed description of the antiblocking agents is found, for example, in EP-A-0 602 964.

The film may be coated and/or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The novel polyester film preferably also comprises a second outer layer. The structure, thickness and make-up of a second outer layer may be selected independently of the outer layer already present, and the second outer layer may likewise comprise the abovementioned polymers or polymer mixtures, but these do not necessarily have to be identical with those of the first outer layer. The second outer layer may also comprise other commonly used outer layer polymers.

Between the base layer and the outer layer(s), there may also be an intermediate layer if desired. It may be composed of the polymers described for the base layers. In a particularly preferred embodiment, it is composed of the polyester used for the base layer. It may also comprise the customary additives described. The thickness of the intermediate layer is generally greater than 0.3 $\mu$m and is preferably in the range from 0.5 to 15 $\mu$m, in particular from 1.0 to 10 $\mu$m.

The thickness of the outer layer(s) is generally greater than 0.1 $\mu$m and is preferably in the range from 0.2 to 6.0 $\mu$m, more preferably in the range from 0.3 to 5.5 $\mu$m, in particular from 0.3 to 5.0 $\mu$m. It is possible for the outer layers to have identical or different thicknesses.

The total thickness of the novel polyester film may vary within wide limits and depends on the application envisaged. It is preferably from 4 to 100 $\mu$m, in particular from 5 to 50 $\mu$m, preferably from 6 to 30 $\mu$m, the base layer preferably presenting a proportion of from about 40 to 90% of the total thickness.

A further advantage is that the production costs of the novel film are only insignificantly greater than those of a film made from standard polyester raw materials. The other properties of the novel film which are relevant to processing and use remain essentially unchanged or are even improved. In addition, it has been ensured that the regenerated material can be reused in a proportion of up to 50% by weight, preferably from 10 to 50% by weight, based on the total weight of the film in each case, in the production of the film without significant adverse effect on its physical properties.

The film has excellent suitability for packaging foods and other consumable items. For this intended use, the films are usually metalized or ceramically coated, (e.g. with $SiO_x$, $Al_xO_y$, $Na_2SiO_4$, etc.). Surprisingly, it has been found that the barrier is significantly better than in conventional metalized or ceramically coated polyester films if the metal layer or ceramic layer is applied to the PEN-containing outer layer of the novel film. Conventional metalized polyester films have barrier values of greater >0.6 $cm^3/(m^2 \cdot d \cdot bar)$. The metalized novel films have barrier values of <0.1 $cm^3/(m^2 \cdot d \cdot bar)$. It has generally been found that, irrespective of the type of coating, the barrier is better by a factor of 10 in the novel films than in conventional polyester films.

It has been found here that even low outer layer thicknesses of <1.5 $\mu$m, preferably <1.0 $\mu$m, are sufficient to create the good barrier mentioned.

Other application sectors for the novel films are can liners, lid films (e.g. lids for yoghurt cups, etc.) and thermo-transfer ribbons.

The following methods were used to characterize the raw materials and the films:

The oxygen barrier was measured using a Mocon Modern Controls (USA) OX-TRAN 2/20 in accordance with DIN 53 380, Part 3. Barrier values of <2 cm$^3$/(m$^2$·d·bar) are assessed as good.

The metal adhesion to the films was evaluated by abrading the metalized surface with a cotton fleece, using the same number of strokes and approximately the same pressure. If the metal was easily removed (with little pressure), the adhesion was assessed as poor.

The SV (solution viscosity) was determined by dissolving a specimen of polyester in a solvent (dichloroacetic acid, concentration: 1% by weight). The viscosity of this solution and that of the pure solvent were measured in an Ubbelohde viscometer. The quotient (relative viscosity $\eta_{rel}$) was determined from the two values, 1.000 was subtracted from this, and the value multiplied by 1000. The result was the SV.

The coefficient of friction was determined according to DIN 53 375, 14 days after production.

The surface tension was determined using the "ink method" (DIN 53 364). The haze of the film was measured in accordance with ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 4° pinhole.

Gloss was determined in accordance with DIN 67 530. The reflectance was measured as an optical characteristic value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

The following examples illustrate the invention. The products used (trademarks and manufacturers) are given only once in each case, and then relate also to the examples which follow.

EXAMPLE 1

The polymer for the outer layer was prepared by copolycondensation. For this, dimethyl terephthalate, 2,6-dimethyl naphthalenedicarboxylate, isophthalic acid and the sodium salt of 5-sulfoisophthalic acid were mixed in a reactor in a molar ratio of 0.15:0.75:0.05:0.05, and then mixed with ethylene glycol and, as catalyst, 300 ppm of manganese acetate. The transesterification was carried out with stirring at from 160 to 250° C., at atmospheric pressure, and the methanol obtained during this process was distilled off. A to manganic equimolar amount of phosphoric acid, as stabilizer, and 400 ppm of antimony trioxide, as catalyst, were then added. The polycondensation was then carried out with stirring at 280° C. and a pressure of less than 1 mbar. The molecular weight achieved could be determined by measuring the torque on the stirrer. After the reaction, nitrogen pressure was used to discharge the melt from the reactor, and it was then pelletized. The SV was 550.

EXAMPLE 2

In a manner similar to that of Example 1, a copolymer was made from 20 mol % of dimethyl terephthalate, 75 mol % of dimethyl 2,6-naphthalate and 5 mol % of isophthalic acid with ethylene glycol. The SV was 600.

EXAMPLE 3

In a manner similar to that of Example 1, a copolymer was made from 98 mol % of dimethyl 2,6-naphthalate, 2 mol % of isophthalic acid and 2 mol % of the sodium salt of 5-sulfoisophthalic acid with ethylene glycol. The SV was 650.

EXAMPLE 4

Polyethylene terephthalate chips were dried at 160° C. to a residual moisture of less than 50 ppm and fed to the extruder for the base layer. In addition, chips from Example 1 were likewise dried at 160° C. to a residual moisture of 50 ppm and fed to the extruder for the outer layer. The melts were filtered and extruded on a coextrusion dye to give a flat film having two layers, discharged over the die lip and solidified on a chill roll.

A transparent film having an overall thickness of 12 μm and having two layers was then produced by stepwise orientation in longitudinal and transverse directions. The outer layer had a thickness of 2.0 μm.

| Base layer: | |
|---|---|
| 95% by weight | of polyethylene terephthalate (RT 49 from Hoechst AG) having an SV of 800 and |
| 5% by weight | of masterbatch made from 99% by weight of polyethylene terephthalate and 1.0% by weight of silica particles (SYLOBLOC ® 44 H from Grace) having an average particle size of 4.5 μm. |
| Outer layer: | Polymer from Example 1 |
| 75 mol % | of ethylene 2,6-naphthalate units |
| 15 mol % | of ethylene terephthalate units |
| 5 mol % | of ethylene isophthalate units |
| 5 mol % | of ethylene 5-sulfoisophthalate sodium salt units |

The individual steps were:

| Extrusion | Temperatures: | |
|---|---|---|
| | Outer layer: | 300° C. |
| | Base layer: | 300° C. |
| | Temperature of the take-off roll: | 30° C. |
| | Die gap width: | 1 mm |
| | Temperature of the take-off roll: | 30° C. |
| Longitudinal stretching | Temperature: | 85–135° C. |
| | Longitudinal stretching ratio: | 4.0:1 |
| Transverse stretching | Temperature: | 85–135° C. |
| | Longitudinal stretching ratio: | 4.0:1 |
| Setting | Temperature: | 230° C. |

In a separate operation, the outer layer of the film was vacuum-metalized in a metalizer. The speed for metalizing was 5 m/s.

After metalizing, the film had the oxygen barrier required.

EXAMPLE 5

In a manner similar to that of Example 4, a three-layer film having an overall thickness of 12 μm was produced by coextrusion. The outer layer A had a thickness of 2.0 μm and the outer layer C a thickness of 1.5 μm. The process conditions were as in Example 4 for all layers. After metalizing, the film had the barrier required. This film, too, was metalized on outer layer A.

| Base layer: | |
|---|---|
| 100% by weight | of polyethylene terephthalate having an SV of 800 |
| Outer layer A: | Copolymer from Example 2 |
| 75 mol % | of ethylene 2,6-naphthalate units |
| 20 mol % | of ethylene terephthalate units |
| 5 mol % | of ethylene isophthalate units |
| Outer layer C: | Copolymer from Example 2 |

EXAMPLE 6

Another three-layer film was produced in a manner similar to that of Example 5. Each of the outer layers had a thickness of 1 μm. Outer layer A was metalized.

| Base layer: | Polyethylene terephthalate with an SV of 800 |
|---|---|
| Outer layer A: | Copolymer from Example 3: |
| 98 mol % | of ethylene 2,6-napthalate units |
| 2 mol % | of ethylene isophthalate units |
| 2 mol % | of ethylene 5-sulfoisophthalate sodium salt units |
| Outer layer C: | |
| 90% by weight | of copolymer from Example 2 |
| 10% by weight | of masterbatch made from 99% by weight of polyethylene terephthalate and 1% by weight of silica particles having an average particle size of 1.0 μm. |

After metalizing, the film had the barrier required.

Comparative Example 1C

A conventional industrially manufactured biaxially oriented film made from polyethylene terephthalate was metalized without any particular pretreatment.

The properties of the films from Examples 4 to 6, and also 1C, are given in

TABLE 1

| Example | Barrier immediately after metalizing | Metal adhesion | Barrier after metal adhesion test |
|---|---|---|---|
| 4 | good | good | good |
| 5 | good | good | good |
| 6 | good | good | good |
| 1C | good | poor | poor |

What is claimed is:

1. A biaxially oriented polyester film comprising:
   (A) a base layer at least 80% by weight of which is composed of one or more thermoplastic polyesters; and
   (B) at least one outer layer, wherein the outer layer is composed of a copolymer or of a mixture of polymers which comprises at least 35 mol % of ethylene 2,6-naphthalate units, from 0 mol % up to 44 mol % of ethylene terephthalate units, from 1 to 20 mol % of ethylene isophthalate units, from 0 mol % up to 20 mol % of a sulfo-substituted aromatic dicarboxylic acid and from 0 mol % up to 10 mol % of units from aliphatic diols, cycloaliphatic diols, aromatic diols, aliphatic dicarboxylic acids, cycloaliphatic dicarboxylic acids, aromatic dicarboxylic acids, or a combination thereof.

2. A film as claimed in claim 1, wherein the outer layer comprises at least 60 mol % of ethylene 2,6-naphthalate units.

3. A film as claimed in claim 1, wherein the outer layer comprises at least 65 mol % of ethylene 2,6-naphthalate units.

4. A film as claimed in claim 1, wherein the outer layer has a thickness of from 0.2 to 6 μm.

5. A film as claimed in claim 1, wherein the outer layer has a thickness of from 0.3 to 5.5 μm.

6. A film as claimed in claim 1, wherein the outer layer has a thickness of from 0.3 to 5.0 μm.

7. A film as claimed in claim 1, which has two layers and is composed of the base layer and the outer layer.

8. A film as claimed in claim 1, having two outer layers, one on each side of the base layer.

9. A film as claimed in claim 1, wherein at least one of the outer layers has been pigmented.

10. A film as claimed in claim 1, at least one side of which has been corona-treated.

11. A film as claimed in claim 1, at least one side of which has been in-line coated.

12. A process for producing a biaxially oriented polyester film of claim 1, which comprises:
    (A) coextruding a film from the base layer and from the one or more outer layers;
    (B) orienting the film biaxially; and
    (C) heat-setting the oriented film.

13. A method for packaging foodstuffs and other consumable items, comprising packaging said foodstuffs and other consumable items in a film as claimed in claim 1.

14. A method of lining a can, comprising lining the can with a film as claimed in claim 1.

15. A method for the production of a lid film, comprising producing the lid film from a film as claimed in claim 1.

16. A method for the production of a thermo-transfer ribbon, comprising producing the thermo-transfer ribbon from a film as claimed in claim 1.

17. A film as claimed in claim 1, further comprising one or more intermediate layers located between the base layer and the outer layers.

18. The process as claimed in claim 9, wherein the coextrusion step further comprises:
    (A) feeding a desired mixing ratio of granules of outer layer starting materials into an extruder;
    (B) heating the granules for about five minutes at about 300° C. so that the materials are converted into a melt;
    (C) feeding, into a second extruder, the polymers for the base layer;
    (D) heating the polymers for the base layer to form a second melt;
    (E) filtering any foreign bodies or contamination present in either of the melts;
    (F) extruding the two melts through a coextrusion die to give flat melt films;
    (G) layering one flat melt film upon the other to form a coextruded film;
    (H) drawing off the coextruded film; and
    (I) solidifying the coextruded film with the aid of a chill roll and other rolls, if desired, forming a film.

19. The process as claimed in claim 9, wherein the orientation step further comprises:
    (A) orienting the film firstly in a longitudinal direction using two rolls running at different speeds corresponding to a longitudinal stretching ratio desired to be achieved; and
    (B) orienting the film secondly in a transverse direction using a tenter frame to achieve a desired transverse stretching ratio.

20. The process as claimed in claim 9, wherein the orientation step further comprises stretching the film simultaneously in a longitudinal and in a transverse direction using a tenter frame.

* * * * *